(12) United States Patent
Michelt et al.

(10) Patent No.: US 9,500,471 B2
(45) Date of Patent: Nov. 22, 2016

(54) OPTICAL MEASURING DEVICE AND METHOD FOR ACQUIRING IN SITU A STAGE HEIGHT BETWEEN A SUPPORT AND AN EDGE REGION OF AN OBJECT

(71) Applicant: Precitec Optronik Gmbh, Neu-Isenburg (DE)

(72) Inventors: Berthold Michelt, Wiesbaden (DE); Matthias Kunkel, Gelnhausen (DE)

(73) Assignee: Precitec Optronik GmbH (DE)

( * ) Notice: Subject to any disclaimer, the term of this patent is extended or adjusted under 35 U.S.C. 154(b) by 0 days.

(21) Appl. No.: 14/307,481

(22) Filed: Jun. 17, 2014

(65) Prior Publication Data

US 2014/0368830 A1 Dec. 18, 2014

(30) Foreign Application Priority Data

Jun. 17, 2013 (DE) .................. 10 2013 010 030

(51) Int. Cl.
*G01B 11/06* (2006.01)
*G01B 11/245* (2006.01)

(52) U.S. Cl.
CPC ......... *G01B 11/0608* (2013.01); *G01B 11/245* (2013.01); *G01B 11/0691* (2013.01)

(58) Field of Classification Search
CPC . G01B 11/0608; G01B 11/245; G01B 11/02; G01B 21/08; G01B 21/02; G01B 11/0691
See application file for complete search history.

(56) References Cited

U.S. PATENT DOCUMENTS 4,861,131 A * 8/1989 Bois .................. G01B 11/0608
250/227.29

5,276,631 A * 1/1994 Popovic ................. G12B 13/00
250/227.11
5,392,124 A 2/1995 Barbee
5,532,815 A 7/1996 Kipman et al.

(Continued)

FOREIGN PATENT DOCUMENTS

CH WO2011086490 * 7/2011 ............ G01B 11/06
CN 101393015 3/2009

(Continued)

OTHER PUBLICATIONS

German Examination Report for German Application No. DE102013010030.5, filed Jun. 17, 2013, mailed Feb. 28, 2014, 12 pgs.

(Continued)

*Primary Examiner* — Michael P Lapage
(74) *Attorney, Agent, or Firm* — Taylor English Duma LLP

(57) ABSTRACT

The invention relates to an optical measuring device for acquiring in situ a difference in distance between a support and an edge region of an object to be measured. The optical measuring device has a measuring head with dual beam guide which directs a first measuring beam towards the support and a second measuring beam towards the edge region of the object to be measured. Means are provided for acquiring and forming reflection spectra of the first measuring beam which is directed towards the support and the second measuring beam which is directed towards the edge region of the object to be measured. The measuring device has a multi-channel measuring apparatus with one spectrometer line. An evaluation unit for the reflection spectra for acquiring the stage height between the support and the edge region of the object works together with a spectrometer and a display unit.

15 Claims, 4 Drawing Sheets

(56) References Cited

U.S. PATENT DOCUMENTS

| | | |
|---|---|---|
| 5,691,540 A | 11/1997 | Halle et al. |
| 5,905,572 A | 5/1999 | Li |
| 6,099,522 A | 8/2000 | Knopp et al. |
| 6,396,069 B1 | 5/2002 | MacPherson et al. |
| 6,672,943 B2 | 1/2004 | Vogtmann et al. |
| 6,673,654 B2 | 1/2004 | Ohno et al. |
| 6,686,270 B1 | 2/2004 | Subramanian et al. |
| 6,768,552 B2 | 7/2004 | Takahashi et al. |
| 6,806,969 B2 | 10/2004 | Clifford, Jr. et al. |
| 6,887,126 B2 | 5/2005 | Brouillette et al. |
| 6,897,964 B2 | 5/2005 | Takahashi et al. |
| 7,271,916 B2 | 9/2007 | Jasapara et al. |
| 7,306,696 B2 | 12/2007 | Lian et al. |
| 7,307,735 B2 | 12/2007 | Hecht et al. |
| 7,443,517 B2 | 10/2008 | Sawabe et al. |
| 7,477,401 B2 | 1/2009 | Marx et al. |
| 7,525,732 B2 | 4/2009 | Uehara et al. |
| 7,652,774 B2 | 1/2010 | Lian et al. |
| 7,705,995 B1 | 4/2010 | Johs et al. |
| 7,738,113 B1 | 6/2010 | Marx et al. |
| 7,826,068 B2 | 11/2010 | Czerkas |
| 7,853,429 B2 | 12/2010 | Fettig et al. |
| 8,716,039 B2 | 5/2014 | Dusemund |
| 8,982,339 B2 | 3/2015 | Schonleber et al. |
| 9,295,391 B1 | 3/2016 | Tearney |
| 9,297,645 B2 | 3/2016 | Schonleber |
| 2002/0153500 A1 | 10/2002 | Fordahl et al. |
| 2003/0016353 A1 | 1/2003 | Detalle et al. |
| 2003/0090671 A1 | 5/2003 | Takahashi et al. |
| 2004/0021874 A1 | 2/2004 | Shimmick |
| 2004/0185582 A1 | 9/2004 | Kueny |
| 2004/0262529 A1 | 12/2004 | Yoshida et al. |
| 2005/0003642 A1 | 1/2005 | Hecht et al. |
| 2005/0073692 A1 | 4/2005 | De Groot |
| 2005/0140981 A1 | 6/2005 | Waelti |
| 2005/0237537 A1 | 10/2005 | Leizerson et al. |
| 2005/0248771 A1 | 11/2005 | Eussen et al. |
| 2006/0132790 A1 | 6/2006 | Gutin |
| 2006/0194419 A1 | 8/2006 | Araki |
| 2007/0046948 A1 | 3/2007 | Podoleanu et al. |
| 2007/0086018 A1 | 4/2007 | Shih et al. |
| 2007/0148792 A1 | 6/2007 | Marx et al. |
| 2007/0188765 A1 | 8/2007 | Zhao et al. |
| 2007/0231717 A1 | 10/2007 | Rivers et al. |
| 2007/0258095 A1 | 11/2007 | Olivier et al. |
| 2008/0013078 A1 | 1/2008 | Podoleanu et al. |
| 2008/0151237 A1 | 6/2008 | Lian et al. |
| 2009/0031792 A1 | 2/2009 | Fan et al. |
| 2009/0059239 A1 | 3/2009 | Hoffmann et al. |
| 2009/0078888 A1 | 3/2009 | Namba et al. |
| 2009/0250635 A1 | 10/2009 | Sykora et al. |
| 2009/0257065 A1 | 10/2009 | Hauger et al. |
| 2009/0273782 A1 | 11/2009 | Yoo et al. |
| 2010/0007894 A1 | 1/2010 | Suehira |
| 2010/0051068 A1 | 3/2010 | Miyanari |
| 2010/0110376 A1 | 5/2010 | Everett et al. |
| 2010/0157308 A1 | 6/2010 | Xie |
| 2010/0265493 A1 | 10/2010 | Jiang et al. |
| 2010/0283842 A1 | 11/2010 | Guissin et al. |
| 2010/0321671 A1 | 12/2010 | Marx et al. |
| 2011/0085136 A1 | 4/2011 | Ferguson et al. |
| 2011/0180521 A1 | 7/2011 | Quitter et al. |
| 2011/0222070 A1 | 9/2011 | Nagai et al. |
| 2011/0292375 A1 | 12/2011 | Marx et al. |
| 2012/0050723 A1* | 3/2012 | Emtman ............ G01B 11/14 356/123 |
| 2012/0238869 A1 | 9/2012 | Schmitt et al. |
| 2012/0257207 A1 | 10/2012 | Marx et al. |
| 2013/0034918 A1* | 2/2013 | Dusemund ............ G01N 21/55 438/8 |
| 2013/0070732 A1 | 3/2013 | Noh et al. |

FOREIGN PATENT DOCUMENTS

| | | | |
|---|---|---|---|
| DE | 19525770 | 8/1996 | |
| DE | 69622943 | 3/2003 | |
| DE | 10319843 | 4/2004 | |
| DE | 102004011189 | 9/2005 | |
| DE | 102004052205 | 5/2006 | |
| DE | 102005036719 | 2/2007 | |
| DE | 102005052743 | 5/2007 | |
| DE | 102006034244 | 1/2008 | |
| DE | 102008041062 | 4/2009 | |
| DE | 102010000079 | 1/2010 | |
| DE | 102008049821 | 4/2010 | |
| DE | 102010016862 | 5/2010 | |
| DE | 102010015944 | 7/2011 | |
| DE | 102011081596 | 4/2012 | |
| DE | 102011051146 | 10/2012 | |
| DE | 102011055735 | * 5/2013 | ......... G01B 9/02091 |
| DE | 102012111008 | 5/2014 | |
| EP | 0905476 | 3/1999 | |
| EP | 1018632 | 7/2000 | |
| EP | 1977850 | 10/2008 | |
| EP | 2159535 | 3/2010 | |
| FR | 2950441 | * 3/2011 | ............ G02B 21/00 |
| GB | 1105819 | 3/1968 | |
| JP | 6065963 | 4/1988 | |
| KR | 1020080112436 | * 12/2008 | ........... H01L 21/304 |
| TW | 200712585 | 4/2007 | |
| TW | 200937005 | 9/2009 | |
| WO | 9727613 | 7/1997 | |
| WO | 2006028926 | 3/2006 | |
| WO | 2007060441 | 5/2007 | |
| WO | 2008010996 | 1/2008 | |
| WO | 2011086490 | 7/2011 | |
| WO | 2011141867 | 11/2011 | |
| WO | 2013070732 | 5/2013 | |
| WO | 2014076649 | 5/2014 | |

OTHER PUBLICATIONS

Precitec Optronic GmbH; International Search Report and Written Opinion for serial No. PCT/IB2014/062290, filed Jun. 17, 2014, mailed Sep. 22, 2014, 20 pgs.

Jakob, Dr. G., "Koaxiale Interferometrische Schichtdickenmessung", Optical Measuring, Sonderdruck aus Photonik Mar. 2000; 4 pgs.

Knuttel, Dr. Alexander; "Non-compact Roughness and 3D Topography Evaluation of grinded Wafers down to nm level", Dec. 1, 2010, 25 pgs.

Malta, D. et al.; "Fabrication of TSV-Based Silicon Interposers", RTI International, 6 pgs.

Niklaus, et al. "Adhesive Wafer Bonding", Journal of Applied Physics, Applied Physics Reviews—Focused Review, 2006, vol. 99, No. 1, pp. 031101.1-031101.28.

Rowland, et al. "Impact of polymer film thickness and cavity size on polymer flow during embossing: toward process design rules for nanoimprint lithography", Journal of Micromechanics and Microengineering, 2005, vol. 15, pp. 2414-2425.

Taiwan Office Action for serial No. 101121622, filed Jun. 15, 2012, mailed May 21, 2014, 15 pgs.

Schoenleber, Martin; German Examination Report for serial No. DE102012102826, mailed Sep. 28, 2012, 14 pgs.

Schonleber, Martin; Final Office Action for U.S. Appl. No. 13/440,434, filed Apr. 5, 2012, mailed Feb. 10, 2014, 20 pgs.

Schonleber, Martin; Non Final Office Action for U.S. Appl. No. 13/440,434, filed Apr. 5, 2012, mailed Oct. 14, 2014, 16 pgs.

Schonleber, Martin; Non-Final Office Action for U.S. Appl. No. 13/440,434, filed Apr. 5, 2012, mailed Sep. 24, 2013, 34 pgs.

Schonleber, Martin; Notice of Allowance for U.S. Appl. No. 13/440,434, filed Apr. 5, 2012, mailed Feb. 12, 2015, 9 pgs.

Schonleber, Martin; U.S. Patent Application entitled: Apparatus and Method for Determining a Depth of a Region Having a High Aspect Ratio that Protrudes into a Surface of a Semiconductor Wafer having U.S. Appl. No. 13/440,434, filed Apr. 5, 2012, 21 pgs.

(56) References Cited

OTHER PUBLICATIONS

Schonleber, Martin; United Kingdom Search Report for serial No. GB1105819.5, filed Apr. 6, 2011, mailed Jul. 23, 2012, 4 pgs.
Dusemund, Claus; Issue Notification for U.S. Appl. No. 13/521,736, filed Jul. 11, 2012, mailed Apr. 16, 2014, 1 pg.
Dusemund, Claus; Non-Final Office Action for U.S. Appl. No. 13/521,736, filed Jul. 11, 2012, mailed Jul. 23, 2013, 18 pgs.
Dusemund, Claus; Notice of Allowance for U.S. Appl. No. 13/521,736, filed Jul. 11, 2012, mailed Dec. 27, 2013, 8 pgs.
Dusemund, Claus; International Preliminary Report on Patentability for serial No. PCT/IB2011/050091, filed Jan. 10, 2011, mailed Aug. 16, 2012, 14 pgs.
Dusemund, Claus; International Search Report and Written Opinion for serial No. PCT/IB2011/050091, filed Jan. 10, 2011, mailed Apr. 12, 2011, 3 pgs.
Huang et al.; "Optical coherence tomography", Science, vol. 254, No. 5035, S. 1178-1181 (1991).
Vakhtin et al.; "Common-path interferometer for frequency-domain optical coherence tomography"; Applied Optics, vol. 42, No. 34, S. 6953-6957 (2003).
Extended European Search Report for serial No. EP12172165, mailed Oct. 24, 2012, 5 pgs.
Precitec Optronik GmbH; Korean Notice of Preliminary Rejection for serial No. 10-2012-0064923, filed Jun. 18, 2012, mailed Oct. 30, 2014, 11 pgs.
Schonleber, Martin; Final Office Action for U.S. Appl. No. 13/525,184, filed Jun. 15, 2012, mailed Oct. 7, 2014, 17 pgs.
Schonleber, Martin; Non-Final Office Action for U.S. Appl. No. 13/525,184, filed Jun. 15, 2012, mailed Feb. 25, 2014, 16 pgs.
Schonleber, Martin; Non-Final Office Action for U.S. Appl. No. 13/525,184, filed Jun. 15, 2012, mailed Feb. 19, 2015, 21 pgs.
Schonleber, Martin; German Examination Report for serial No. DE102011051146, filed Oct. 4, 2012, mailed Jan. 19, 2012, 6 pgs.
Schonleber, Martin; U.S. Patent Application entitled: Test Device and Bonding Layer Between Wafer-Shaped Samples and Test Process for Testing the Bonding Layer, having U.S. Appl. No. 13/525,184, filed Jun. 15, 2012, 23 pgs.
Schonleber, Martin; Final Office Action for U.S. Appl. No. 13/667,809, filed Nov. 2, 2012, mailed Sep. 16, 2013, 9 pgs.
Schonleber, Martin; Issue Notification for U.S. Appl. No. 13/667,809, filed Nov. 2, 2012, mailed Feb. 25, 2015, 1 pg.
Schonleber, Martin; Non-Final Office Action for U.S. Appl. No. 13/667,809, filed Nov. 2, 2012, mailed Apr. 15, 2013; 12 pgs.
Schonleber, Martin; Non-Final Office Action for U.S. Appl. No. 13/667,809, filed Nov. 2, 2012, mailed Apr. 24, 2014; 8 pgs.
Schonleber, Martin; Notice of Allowance for U.S. Appl. No. 13/667,809, filed Nov. 2, 2012, mailed Dec. 4, 2014, 10 pgs.
Schonleber, Martin; U.S. Patent Application entitled: Material-Working Device with In-situ Measurement of the Working Distance, having U.S. Appl. No. 13/667,809, filed Nov. 2, 2012, 32 pgs.
Schonleber, Martin; International Preliminary Report on Patentability for serial No. PCT/IB2011/052048 filed May 10, 2011, mailed Nov. 22, 2012, 7 pgs.
Schonleber, Martin; International Search Report and Written Opinion for serial No. PCT/IB2011/052048 filed May 10, 2011, mailed Sep. 21, 2011, 2 pgs.
Schonleber, Martin; International Search Report and Written Opinion for PCT/IB2013/060127, filed Nov. 14, 2013, mailed Mar. 21, 2014, 17 pgs.
Schonleber, Martin; U.S. Patent Application entitled: Optical Measuring Method and Measuring Device Having a Measuring Head for Capturing a Surface Topography by Calibrating the Orientation of the Measuring Head, having U.S. Appl. No. 14/713,150, filed May 15, 2015, 54 pgs.
ISIS Sentronics Gmbh Data Sheet, "StraDex a3 sensor"; 3 pgs.
Schonleber, Martin; Non-Final Office Action for U.S. Appl. No. 13/440,434, filed Apr. 5, 2012, mailed Jun. 25, 2015, 21 pgs.
Schonleber, Martin; Notice of Allowance for U.S. Appl. No. 13/440,434, filed Apr. 5, 2012, mailed Sep. 23, 2015, 11 pgs.
Schonleber, Martin; Applicant Interview Summary for U.S. Appl. No. 13/525,184, filed Jun. 15, 2012, mailed Oct. 27, 2015, 3 pgs.
Schonleber, Martin; Final Office Action for U.S. Appl. No. 13/525,184, filed Jun. 15, 2012, mailed Jul. 28, 2015, 32 pgs.
German Examination Report for serial No. 102012111008.5, filed Nov. 15, 2012, mailed Jun. 19, 2013, 17 pgs.
Schonleber, Martin; Corrected Notice of Allowability for U.S. Appl. No. 13/440,434, filed Apr. 5, 2012, mailed Mar. 1, 2016, 6 pgs.
Schonleber, Martin; Issue Notification for U.S. Appl. No. 13/440,434, filed Apr. 5, 2012, mailed Mar. 9, 2016, 1 pg.
Schonleber, Martin; Notice of Allowance for U.S. Appl. No. 13/440,434, filed Apr. 5, 2012, mailed Jan. 13, 2016, 11 pgs.
Schonleber, Martin; Non-Final Office Action for U.S. Appl. No. 13/525,184, filed Jun. 15, 2012, mailed Dec. 31, 2015, 21 pgs.
Lucke, et al.; Article entitled: "Mikrooptische Sensoren nach dem chromatisch konfokalen Messprinzip", Forschungszentrum Karlsruhe GmbH, Karlsruhe 2006, 23 pgs.
Micro-Epsilon USA; Brochure for Confocal Chromatic Measurement System, cited in the German Examination Report for serial No. 10 2014 008 584.8, mailed on Apr. 21, 2016, 11 pgs.
Micro-Epsilon; Article entitled: "New Generation of Confocal Measurement Technology", located at <http://www.microepsilon.com/press/release/PR231confocalDT/index.html?sLang=us>, accessed on Jul. 7, 2016, 2 pgs.
Precitec Optronik GmbH; French Preliminary Search Report and Written Opinion for serial No. FR1253225, mailed Nov. 13, 2013, 10 pgs.
Precitec Optronik GmbH; German Examination Report for serial No. 102014008584.8, mailed Apr. 21, 2016, 13 pgs.
Machine translation for Patent No. FR2950441, accessed on Jun. 7, 2016, 13 pgs.
Schonleber, Martin; Notice of Allowance for U.S. Appl. No. 13/525,184, filed Jun. 15, 2012, mailed Jul. 12, 2016, 21 pgs.
Schonleber, Martin; Non-Final Office Action for U.S. Appl. No. 14/713,150, filed May 15, 2015, mailed Sep. 6, 2016; 50 pgs.

* cited by examiner

OPTICAL MEASURING DEVICE AND METHOD FOR ACQUIRING IN SITU A STAGE HEIGHT BETWEEN A SUPPORT AND AN EDGE REGION OF AN OBJECT

CROSS-REFERENCE TO RELATED APPLICATIONS

This application claims priority to German application DE102013010030, filed Jun. 17, 2013, which is incorporated reference herein in its entirety.

TECHNICAL FIELD

The invention relates to an optical measuring device for acquiring differences in distance and an optical measuring method using the measuring device.

BACKGROUND

An optical measuring device for measuring surfaces is known from publication DE 10 2008 041 062 A1. The known measuring device produces a measuring light beam which, after passing through at least three separately focussing optical components, impinges on the surface of the object, is reflected by it and is detected by a spatially resolving light detector together with a reference light following interferential superposition.

To achieve this the known measuring device has an optical assembly which comprises the at least three separately focussing optical components. The main axes of these separately focussing optical components are positioned offset in relation to one another and side by side. In addition, the known measuring device has a beam splitter positioned in a beam path of the measuring light beam. Furthermore, a reference face and a spatially resolving light detector are provided for the known device.

The light source, the beam splitter and the optical assembly are positioned in relation to one another so that measuring light emitted by the light source and passing through the focussing optical components impinges on the surface, is reflected by it and impinges on the detector via the focussing optical components. In addition, the known measuring device has an evaluation system for receiving image data from the spatially resolving light detector and outputting measurement data which represents a surface shape of the surface. To do this distance values representing a distance between a location on the surface and the focussing optical components are acquired. From these distance values the evaluation system forms parameters which represent the surface shape of the surface.

In addition, the above publication discloses a method for measuring a surface of an object comprising essentially the following steps. First, a measuring light is produced. From this measuring light are formed three converging partial beams of a first part of the measuring light to light three regions of the surface of the object which are positioned a certain distance apart. The reflected light, or the three partial beams of the light reflected by the surface, are directed together with a second part of the measuring light towards a spatially resolving detector where they form interferences. Finally, these interferences are analysed by a detector that detects light intensities in order to represent the surface shape of the surface of the object by corresponding measurement data.

Further known methods are specified in publication DE 10 2008 041 062 A1, U.S. Pat. No. 7,826,068 B2, US 2009/0078888 AS1, WO 2013/070732 A1, U.S. Pat. No. 7,853,429 B2, U.S. Pat. No. 7,443,517 B2, DE 10 2011 081 596 A1, DE 10 2011 055 735 and KR 10 2008 0112436.

The measuring of stages between a rotating support and a rotating edge region of an object to be measured, in particular an object to be thinned, requires a robust measuring device which occupies a limited amount of space while withstanding high environmental pollution.

For this reason conventional, robust stage measuring devices continue to operate with tactile probes, one probe scanning the surface of a narrow exposed edge region of the object to be measured and a second probe positioned on the upper face of the rotating support so that the stage height from the millimeter range to the multiple micrometer range which arises during machining can be acquired from the acquirable distances between the two probes. One difficulty of such tactile measuring methods lies in the appropriate dosing of the pressing force on the edge region of the object to be measured on one hand and on the surface of the support material on the other.

If the pressing force is too high, the possibility of damage to the edge regions of the object to be measured cannot be excluded, especially since a multiplicity of grinding rotations of the object is required to thin the object from a thickness in the millimeter range to thicknesses of below 100 micrometers. If the pressing force is too low, interference occurs because the probes are exposed to considerable measuring errors and measurement inaccuracies at least on the relatively rough upper face of the support as a result of grinding particles occurring during thinning.

SUMMARY

There is a need for a robust measuring device and a correspondingly robust measuring method that overcome the disadvantages of the state of the art whilst simultaneously delivering reliable measurement results.

An optical measuring device with the characteristics of the independent claim 1 and a measuring method with the characteristics of independent claim 14 are provided.

In this context a chromatic confocal distance measuring technique is understood to mean a method which uses the effect in which lenses for different wave lengths of light have different focal points. Here chromatic confocal distance measurement uses the dispersion of spectral broadband light in an optical imaging system to determine exactly the distance between a reflecting surface and the measuring head. A spectral broadband point light source, which usually takes the form of a first pinhole diaphragm or an optical fibre end, is focussed on the object in the optical imaging system. Here the distance from the focus to the imaging system is a clear, permanently defined function of the wave length. The reflected light is represented again by the same imaging system and decoupled and projected onto a pinhole diaphragm positioned at the mirror point of a beam splitter by the lighting beam path. Alternatively, the reflected light can also be fed back directly into the first pinhole diaphragm and then decoupled. A detector behind the pinhole diaphragm then determines the dominant wavelength of the reflected light. From the knowledge of the focal lengths of the individual wavelengths it is possible to determine the object distance directly from the dominant wavelength. An advantage of this method is the absence of moving components.

Furthermore, optical coherence tomography (OCT) denotes an examination method in which spectral broadband light is used to measure the distance between objects with the aid of an interferometer. In this process the object being examined is point-scanned. An arm with a known optical path length is used as a reference to a measuring arm. The interference of the partial waves of the two arms results in a pattern from which it is possible to read the difference between the optical path lengths of the two arms.

A distinction is made here between two interferometric measurement and evaluation methods, so-called "time domain" OCT and "frequency domain" OCT. They involve on one hand a time domain (TD) signal and on the other a frequency domain (FD) signal. This means either that the length of the frequency arm changes and the intensity of the interference is measured continuously without taking the spectrum into consideration (time domain) or that the interference of the individual spectral components is acquired (frequency domain).

The measuring device and the measuring method according to this application can advantageously be used both with chromatic confocal and interferometric distance measurement techniques. This is particularly true when it is used with an in situ reduction in stage height during the machining of a rotating measurement object to be measured or thinned and a rotating support.

In particular, to create a reliable and contactless measurement technique which is robust in a grinding environment it is possible in a first embodiment of the invention to use an optical measuring device for acquiring differences in distance comprising a measuring head with dual beam guide which directs a first measuring beam towards the support and a second measuring beam towards the edge region of the object.

Furthermore, the optical measuring device has a measuring head guide device in which is positioned the measuring head to acquire the stage height. In addition, the optical measuring device has a spectral broadband light source which produces light beams. Corresponding measuring head optics can represent at least one first measuring point on the support and one second measuring point on the edge region of the object. Means for acquiring and forming reflection spectra of the first measuring beam which is directed towards the support and the second measuring beam which is directed towards the edge region of the object to be measured work together with an evaluation unit for the reflection spectra to acquire the stage height between the support and the edge region of the object.

One advantage of this optical measuring device is the dual beam guide of the measuring head which is achieved in a further embodiment of the invention by inserting two adjacent measuring heads into the measuring head guide device, a first measuring beam being directed towards the surface of the surface adjacent to the edge region of the object to be measured and a second measuring beam of the second measuring head scanning the edge region of the object to be measured in situ.

In a further embodiment of the invention it is possible by means of corresponding measurement optics in the measuring head to split the measuring beam so that a first measuring spot on the surface of the support produces reflections which are suitable for distance evaluation and a second measuring spot adjacent to the edge region of the object to be measured produces reflections which are also suitable for distance evaluation in the optical measuring device. The difference between the two distance results is able to constantly monitor the decrease in thickness of the object to be measured and display it in situ on an appropriate display.

The scanning rate of, for example, 4 kHz makes it possible to recognise measurement outliers and thus measuring errors and to eliminate them using a suitable digital measurement filter. As over 4000 scanning values per second can be acquired, measuring errors due to dust and aerosol particles can be eliminated reliably and a robust measurement result filtered out such that using this optical measuring device the decrease in stage height can be measured reliably and robustly despite the aggravated environmental conditions.

The robustness of the measuring method can be increased by choosing a light wave length rate for the broadband light source for the measurement for which both the material of the support and the material of the object to be measured are non-transparent.

In a further embodiment of the invention the measuring head is provided for in situ chromatic confocal acquisition of the stage height. Furthermore, the measuring device is also equipped with a measuring head for the in situ interferometric acquisition of the stage height. By a simple process of changing the measuring heads and the measurement programs it is possible to switch from one method to the other and to achieve optimal adjustment of the optical measuring device to the measuring environment.

As has already been set out above, the optical measuring device can have a measuring head which comprises two optical measuring heads of a multi-channel measuring apparatus which are positioned side by side and connected mechanically in the measuring head guide device. Nevertheless, a compact measuring head of this type in the measuring head guide device still works with two independent measurement value acquisition systems to acquire differences in distance.

In a further embodiment of the invention the measuring head can have two measuring fibres that can be oriented mechanically and work together with the multi-channel measuring apparatus, preferably with a dual channel measuring apparatus. A measuring head of this type also works with two independent measurement value acquisition systems.

Here the two measuring head fibres of the optical measuring device can be supplied via a fibre optic Y-coupler which decouples the light from the spectral broadband light source into two optical fibres. Even if the optical measuring method requires a reference measurement section, this can be achieved relatively robustly through fibre optic measures in which only one fibre optic part is mirrored on one side and can be integrated into a robust fibre optic strand.

To evaluate the reflected light from the two measuring points, on one hand from the upper face of the support and on the other the surface of the edge region of the object to be measured, the multi-channel measuring apparatus can have at least two spectrometers. Alternatively, it is also possible to use one spectrometer and to position a multiplexer upstream of it so that in multiplex mode the scanning results of the first measuring beam and the second measuring beam are forwarded alternately to one signal spectrometer via an optical fibre. On the other hand, the multi-channel measuring apparatus can also have a multi-line detector. This represents a cost-effective alternative.

In a further embodiment of the invention the optical measuring device is equipped with at least one spectrometer line with which the measured distance can be represented and evaluated as a measure of the stage height. To achieve this the same spectrometer line is used both to detect and measure the reflected light from the first measurement beam and to detect and measure the reflected light from the second measuring beam. When several measuring head pairs are present to measure several differences in distance, the spectrometer can also have several spectrometer lines, though this need not necessarily be the case. There are therefore embodiments in which the light of several measuring head pairs can be measured with one single spectrometer line.

Using a chromatic confocal method distance peaks can be determined directly from the reflection spectrum. In other embodiments, in which spectral interferometric methods are used additionally or as an alternative, equalisation and then a Fourier transformation, or a so-called fast Fourier transformation (FFT), preferably takes place in order to determine the distance peaks.

To create several measurement channels, each measuring head can advantageously be connected separately to a light guide, in particular an optical fibre, the light thereby being supplied separately to the common spectrometer line assigned to all measuring heads via separate light guides. To achieve this each of the light guides or optical fibres can be connected to an input of the multi-channel measuring apparatus and inside the multi-channel measuring apparatus the inputs can be separate, i.e. connected to the spectrometer by an individual dedicated light guide. At the spectrometer input the light guides or optical fibres can end in a fibre optic connector, the fibre optic connectors plugging into a holder for fibre optic connectors which can be positioned before a collimator lens of the spectrometer.

Thus it is possible to achieve a particularly robust and accurate multi-channel device which is also cost effective.

In a further embodiment of the invention the optical measuring device has means for digitising reflection spectra of the first measuring beam which is directed towards the support and of the second measuring beam which is directed towards the edge region of the object to be measured. The measuring device has an evaluation unit for these digitised reflection spectra which can be used to acquire the stage height between the support and the edge region of the object.

Here, as has already been set out above, it is possible to detect measurement outliers caused by swarf particles, aerosol particles and dust particles in the environment due to the high optical scanning rate of, for example, at least 4 kHz and to filter them out using an electronic filter as detailed above. It is also possible to protect the environment of the dual measuring beam by means of gas flushing or liquid flushing taking into account any resulting change in refractive index compared to an air environment.

A further aspect of the invention relates to an optical measuring method for the in situ acquisition of a difference in distance between a support and an edge region of an object to be measured. To achieve this the measuring method comprises the following steps. An optical measuring device with a measuring head with dual beam guides is provided in a measuring head guide device to acquire the distance to the surface of the support and to the surface of the edge region of the object to be measured.

A spectral broadband light of a light source is then applied via light guides and the measuring head optics as a measuring spot onto the surface of the support and onto the surface of the edge region of the object to be measured. In the process the reflected measuring beams are fed back into measuring channels of the measuring device which has at least one interference spectrometer, the reflection spectra of the reflected light beams being acquired by the interference spectrometer.

The reflection spectra are then evaluated, systematic and extreme measuring errors are subtracted out and the continuously diminishing thickness of the object to be measured is ascertained in situ.

This method allows robust monitoring of the thinning of an object such as a semiconductor wafer or ceramic wafer, for example, which is held in a corresponding grinding device and rotated about an axis, an edge region of the object to be measured being available for a stage height measurement in relation to a support which is also rotating but in the opposite direction.

The rotating support is usually a grinding disc which rotates about an axis of rotation having a radius which is markedly larger than the diameter of the disc-shaped object to be measured so that several objects to be measured can be positioned on the grinding disc. Each of the objects to be measured is held on the surface of the grinding disc by a rotating holder, it being possible for the diameter of such objects to be measured to be greater than 10 inches and the starting thickness of such objects to be measured to be in the millimeter range. The objects can then be thinned to thicknesses of less than 100 micrometers with the aid of the grinding disc with the support and the holder rotating in opposite directions.

Due to its high scanning rate of more than 4000 cycles per second, the method is able to acquire, filter out and eliminate measuring errors due to the interference which may occur due to grinding particles, grinding dust or aerosols of air and particles of grinding compound and other stochastic or periodic measuring errors, thereby guaranteeing robust monitoring of the decrease in the thickness of the object to be measured as measurement outliers of this type can be filtered out due to the high scanning rate.

Even inherent errors such as may occur due to the curvature of the surface of the support or vibrations of the whole grinding structure, can be acquired and eliminated with the aid of the dual beam guide and the downstream evaluation unit, making it possible to provide a relatively robust measuring method for the problematic environment of automatic grinding machines as a result of the two independent measurement value acquisition systems.

To achieve this, in a preferred embodiment of the method the measuring head in the measuring head guide device can have two optical measuring heads positioned side by side and connected mechanically in a multi-channel measuring apparatus. An optical measuring device of this type has the advantage that there can be no interaction between the two measuring heads and thus between the distance measurement results.

In addition, it is possible for the measuring head to have two measuring fibres that can be oriented mechanically and work together with the multi-channel measuring apparatus, preferably with a dual channel measuring apparatus. A measuring head of this type that has only two individual fibres or fibre bundles can be relatively compact in construction and thus be adapted to a thinning device without taking up too much space.

In addition, fibre optic solutions of this type can also be used in a further embodiment to decouple the light of the spectral broadband light source into two optical fibres via a fibre optic Y-coupler.

In the process during measurement a first measuring point is formed on the support and a second measuring point is formed on the edge region of the object to be measured and the distances from them to the measuring head are acquired and the stage height is calculated by subtraction.

As has already been set out above, two different measuring methods can be used for the method, namely the chromatic confocal measuring method for acquiring stage height and the interferometric measuring method.

It is particularly advantageous for the reflection spectra of the first measuring beam which is directed towards the support and the second measuring beam which is directed towards the edge region of the object to be digitised. Due to digitisation it is possible to eliminate outliers caused by grinding particles in the environment of a grinding machine by using the aforementioned electronic filter, for example. The measuring method disclosed in the invention is thus extremely robust in a grinding plant environment.

Because the measuring heads are configured not separately by rather as dual measuring heads, the optics requires only a small amount of space making the device particularly suitable for in situ measurements and the in situ testing of object heights during the grinding of semiconductor wafers and ceramic discs for the electronics industry, for example. Furthermore, the stages occurring in the edge regions when grinding objects correspond to a multiplicity of optical wavelengths. The optical measuring device and the method can also be used expediently in the conditions prevailing manufacturing plant polluted with grinding dust, grinding compounds and aerosols, in particular in optical stage measurements on rotating surfaces.

BRIEF DESCRIPTION OF THE DRAWINGS

The invention is described in greater detail below with reference to the attached drawings.

DETAILED DESCRIPTION

Figure 1:
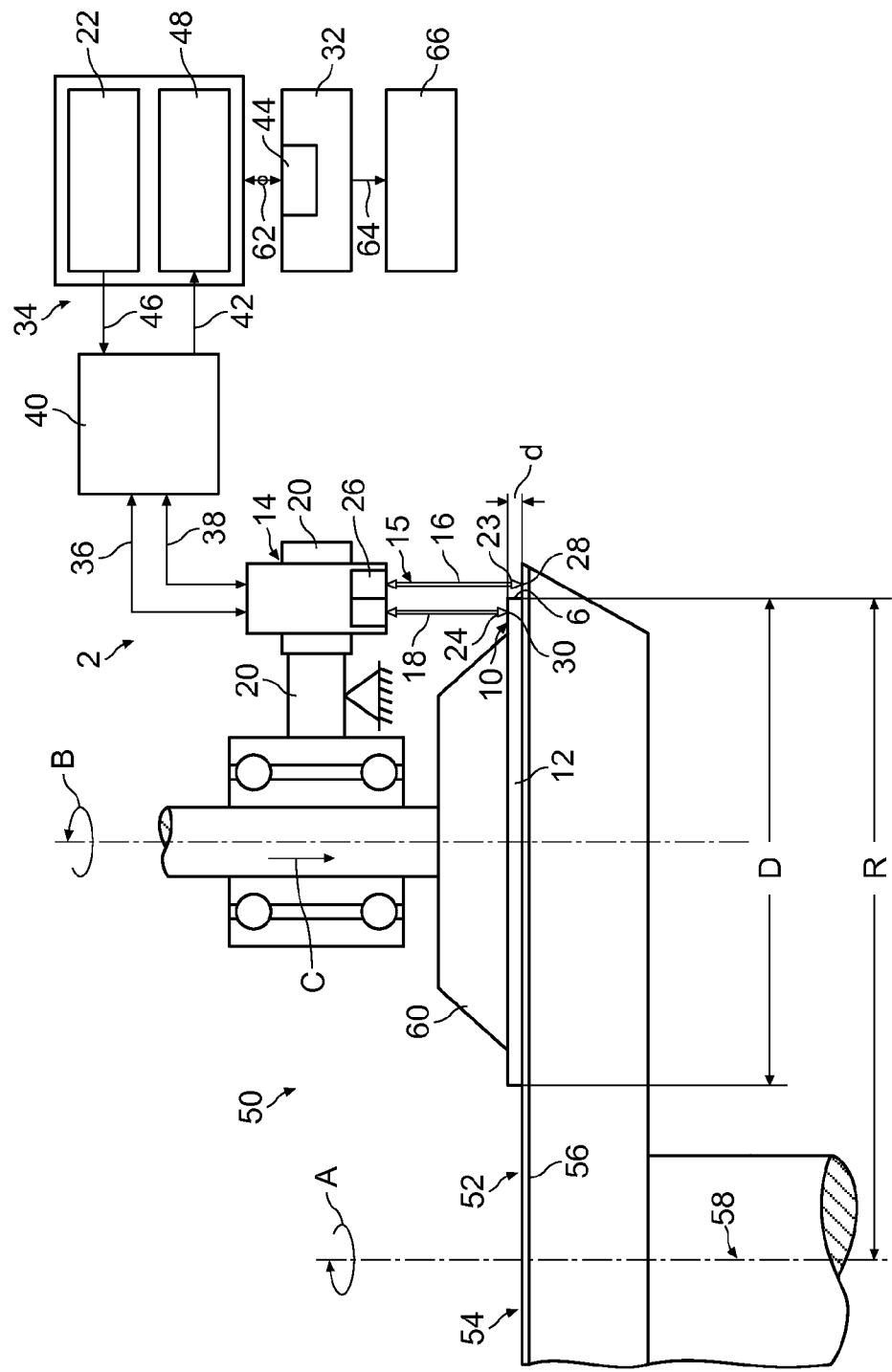
FIG. 1 shows a schematic diagram of an optical measuring instrument for acquiring a difference in distance in use on a thin grinding machine according to one embodiment of the invention.

FIG. 1 shows a schematic diagram of an optical measuring instrument 2 for acquiring a difference in distance 6, here: a stage height used on a thin grinding machine 50 according to an embodiment of the invention. The thin grinding machine 50 has a grinding disc 52, the surface 54 of which can be covered with a layer 56 of grinding compound. The grinding disc 52 is supported such that it is able to rotate about an axis 58 in the direction of arrow A. A disc-shaped object 12 to be measured having a thickness d in the millimeter range and a diameter D of more than 10 inches/25 cm, which nowadays has large ready pre-produced storage and/or logic chips on its the active upper face stuck to the holder, is pressed in the direction of arrow C by a holder 60 that rotates in the direction of arrow B during grinding onto the surface 54 of the grinding disc 52 with the rear face of the object to be measured.

To achieve this the diameter of the rotating holder 60 is selected such that an edge region 10 of the disc-shaped object 12 projects over the boundaries of the rotating holder 60, resulting in a measurable height stage 6 between the edge region 10 of the object 12 rotating with the holder 60 and the surface 54 of the grinding disc 52 which forms a support 8. To achieve this the radius R of the grinding disc 52 is markedly larger than the diameter D of the rotating holder. It is therefore possible to position a plurality of objects 12 on the grinding disc 52 which rotates in the direction of arrow A. The rotating holder 60 may have a direction of rotation B opposite to the direction of rotation A of the grinding disc 52.

To measure the diminishing height stage 6 during thin grinding a stationary measuring head guide device 20 of the optical measuring device 2 is positioned in a fixed manner with each holder 60. The measuring head guide device 20 thereby holds a measuring head 14 with dual beam guide 15 in a stationary position while the object 12 to be measured, particularly the edge region 10, moves in a rotatory manner under a second measuring beam 18 of the measuring head 14.

The surface 54 of the grinding disc 52 moves simultaneously under a first measuring beam 16 of the dual beam guide 15 so that in this embodiment of the invention the measuring head 14 is able to supply the reflected light of a first measuring point 28 on the surface 54 of the support 8 and a second measuring point 30 on the surface of the edge region 10 of the thinning object 12 via optical fibres 36 and 38 to a multiplexer 40 which on one hand supplies a broadband light from a light source 22 via a light guide 46 to the measuring head 14 and on the other supplies the reflected light components of the measuring points 28 and 30 via a light guide 42 to a spectrometer 48.

The spectrometer 48 is connected via a sensor line 62 to an evaluation unit 32 via which digitised interference spectra are supplied via an electronic filter 44 to the evaluation unit 32. Here the electronic filter 44 is able to eliminate measuring value outliers resulting from the environment of the grinding machine, for example, as errors so that the evaluation unit 32 is able to continuously forward a value for the stage height measurement corrected of measuring errors via a connecting line 64 to a display unit 66.

It is self-evident that in a grinding machine of this type for every object to be measured there is provided a measuring head guide device 20, each with a corresponding measuring head 14 and downstream measuring and evaluation unit, it being possible due to the multiplexer 40 to evaluate and represent on the display 66 a plurality of signals from the required measuring heads. Depending on the relationship between the radius R of the grinding disc 52 and the diameter of the objects to be measured, three to sixteen objects 12 to be measured are monitored by corresponding measuring heads 14 and thinned from a thickness d in the millimeter range to a thickness d in a range of a few tens of micrometers.

Figure 2:
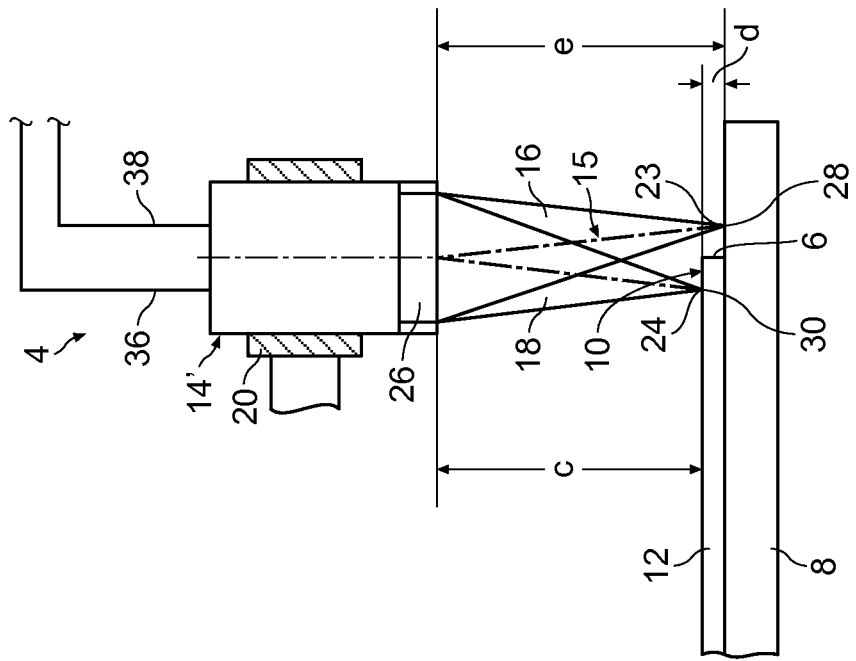
FIG. 2 shows in detail a measuring head of the device according to FIG. 1.

FIG. 2 shows in detail a measuring head 14 of the device according to FIG. 1. This measuring head 14 is held by the measuring head guide device 20 and comprises two individual measuring heads 140 and 141 held together side by side in the measuring head guide device 20, a first measuring head 140 acquiring the distance e between measuring head 140 and the surface 54 of the support 8 and the second single measuring head 141 acquiring the distance c between the measuring head 141 and the surface of the edge region 10 of the object to be measured 12. The decreasing thickness $d(t)=e-c(t)$ results from the difference between the acquired distances e and c(t) and the non-transparent surfaces of the measuring disc 52 or the edge region of the object to be thinned 12.

Figure 3:
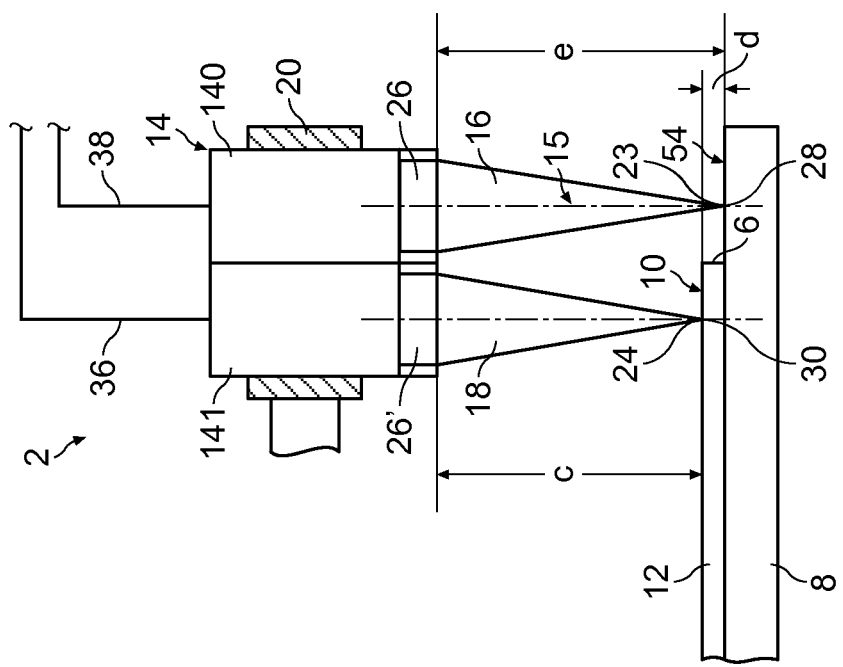
FIG. 3 shows in detail a modification of the measuring head according to FIG. 1.

FIG. 3 shows in detail a modification of the measuring head 14' according to FIG. 1. This modified measuring head 14' differs from the measuring head 14 in FIG. 2 in that two separate measuring points, with measuring point 28 on the support 8 and measuring point 30 on the edge region 10 of the object 12 to be measured, are formed by appropriate measuring head optics 26. The reflected light is fed back into the optical fibres 36 and 38 and forwarded via the multiplexer 40 to the evaluation unit for evaluation, the interference values of the spectrometer 48 being digitised, as shown in FIG. 1.

Figure 4:
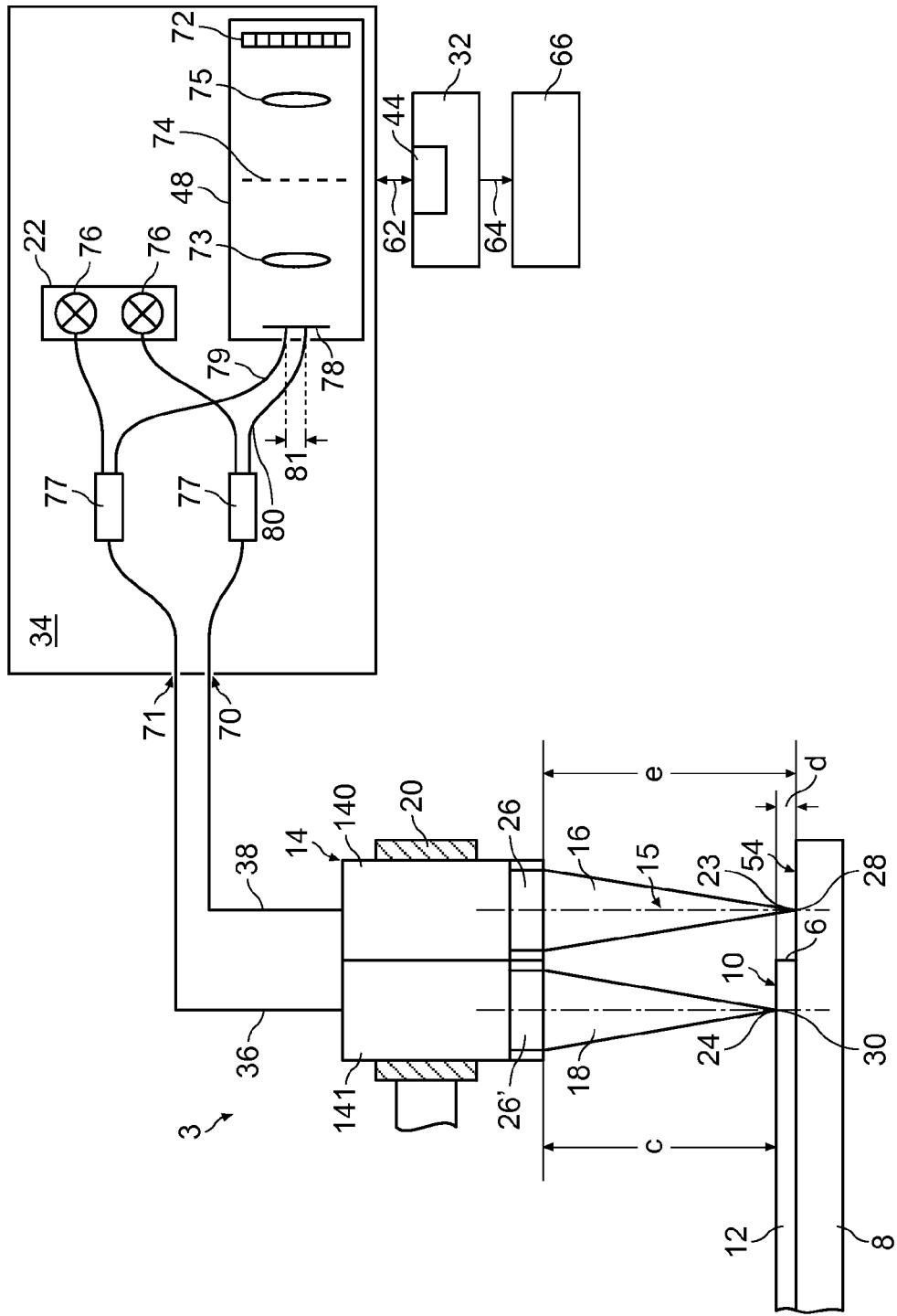
FIG. 4 shows a schematic diagram of an optical measuring instrument for acquiring a difference in distance according to an embodiment of the invention wherein the optical measuring instrument 2 has measuring heads and a multichannel measuring apparatus with a spectrometer with a single spectrometer line.

FIG. 4 shows an optical measuring device 3 according to a third embodiment. The optical measuring device can be used in combination with a thin grinding machine 50 which has been explained in further detail above. However, the invention is not limited to this type of application scenario. In fact, the invention can be used wherever differences in distance are to be determined by an optical measuring method. These may be differences in distance between a support and the surface of an object on the support or, for example, differences in distance resulting from the form and shape of an object to be measured. Quite different applications are conceivable though for the sake of simplicity they are not explained in greater detail here. For example, possible applications for the optical measuring device described here may include the measurement of bottles or other objects.

However, the optical measuring device 3 is particularly suited for measuring thicknesses, in particular thicknesses of an object such as an object 12 to be thin ground, for example, positioned on a support 12 of a thin grinding machine 50. A further reason for this is that the optical measuring device 3 can be of particularly compact and robust design since in one variant two measuring heads 140, 141 can be combined to form a measuring head 14 designed as a dual measuring head.

Some of the elements of the optical measuring device 3 according to the third embodiment and the other elements shown in FIG. 4 have already been explained in reference to the figures detailed above and there is there no need to describe them all in detail again here.

In contrast to the embodiments described above, in this embodiment the structure of a particular variant of the multi-channel measuring apparatus 34 is explained. The multi-channel measuring apparatus 34 has a spectrometer line 72. The spectrometer line 72 is positioned in a spectrometer 48 which also has a collimator 73, a grating 74 and a focussing lens 75. The person skilled in the art will recognise that these components are exemplary and that in other embodiments the grating 74, for example, can be replaced by a prism.

Furthermore, the multi-channel measuring apparatus 34 has a light source 22 which can itself have further individual light sources 76. Positioned inside the multi-channel measuring apparatus 34 are two Y-couplers 77, one input of each Y-coupler being connected to one of the various light sources 76. In this manner the measuring heads 140, 141 can be supplied with light with a broadband spectrum particularly efficiently.

As has already been set out above, the measuring heads 140, 141 are positioned in an optical measuring head 14 with dual beam guide 15, thereby forming a dual measuring head. To achieve this the measuring heads 140, 141 are positioned side by side in a measuring head guide device 20 and connected together mechanically. Thus the optical measuring device in the vicinity of the object to be measured at which differences in distance are to be measured can be of particularly robust and space-saving design.

The light source 22 or the two individual light sources 76 supply spectral broadband light, thereby forming a first measuring beam 16 and a second measuring beam 18. In doing so, in this embodiment the first measuring head 140 directs the first measuring beam 16 towards a first measuring point 28 located on the support 8 and the second measuring head 141 directs the second measuring beam 18 towards a second measuring point 30 located on the edge region 10 of the object 12.

Positioned in the first measuring head 140 are means for acquiring and forming reflection spectra of the first measuring beam 16 which is directed towards the first measuring point 28. In addition, positioned in the second measuring head 141 are means for acquiring and forming reflection spectra of the second measuring beam 18 which is directed towards the second measuring point 30. The means for acquiring and forming reflection spectra can operate according to an interferometric method in which the relevant measuring head 141, 141 can have a reference mirror and a beam splitter cube (not shown). However, the invention is not limited to an embodiment of this type. For example, at least one of the measuring heads 140, 141 can also work according to a chromatic confocal method.

The two measuring heads 140, 141 are oriented towards one another in a pre-defined manner and, as shown in FIG. 4, can preferably be at the same geometrical height. As a result, measuring head 140, which thus measures a larger distance e, detects a bluer light than measuring head 141 which thus measures a smaller distance c. In other words, the first measuring head 140 should measure bluer light, while the second measuring head 141 should measure redder light.

The light from the reflection spectra is coupled into the multi-channel measuring apparatus 34 by the optical fibres 36, 38, the first optical fibre 38 connecting the first measuring head 140 to a first input 70 of the multi-channel measuring apparatus 34 and the second optical fibre 36 connecting the second measuring head 141 to a second input 71 of the multi-channel measuring apparatus 34. Each input 70, 71 of the multi-channel measuring apparatus corresponds to an individual measuring channel of the optical measuring device. The inputs 70, 71 can be connected via a Y-coupler to the spectrometer 48, as shown in FIG. 4. On the input side the spectrometer has a holder 78 for fibre optic connectors. The optical fibres 36, 38 can be routed via the Y-coupler to the holder 78, it being possible for the light guides 79 and 80 to be offset in relation to one another in spectral direction along the direction of the spectrometer line 72.

Here the extent of the offset 81 can lead to a difference in the characteristic curves, causing the reflection spectra of the measuring heads 140, 141 to differ from one another. This difference in the characteristic curves is taken into account in an appropriate manner in the subsequent evaluation of the resulting distance peaks. This applies preferably when using chromatic confocal measuring methods. With interferometric measuring methods such as OCT, for example, the light guides 79, 80 should preferably be positioned at the same height in spectral direction but can also be positioned perpendicular to the spectrometer line 72 offset in relation to one another instead. The spectrometer line 72 should acquire all the light detected by the measuring heads 140, 141 arriving at the spectrometer 34. The spectrometer line 72 is preferably of sufficient height and has sufficient detector pixels for this purpose.

Figure 5:
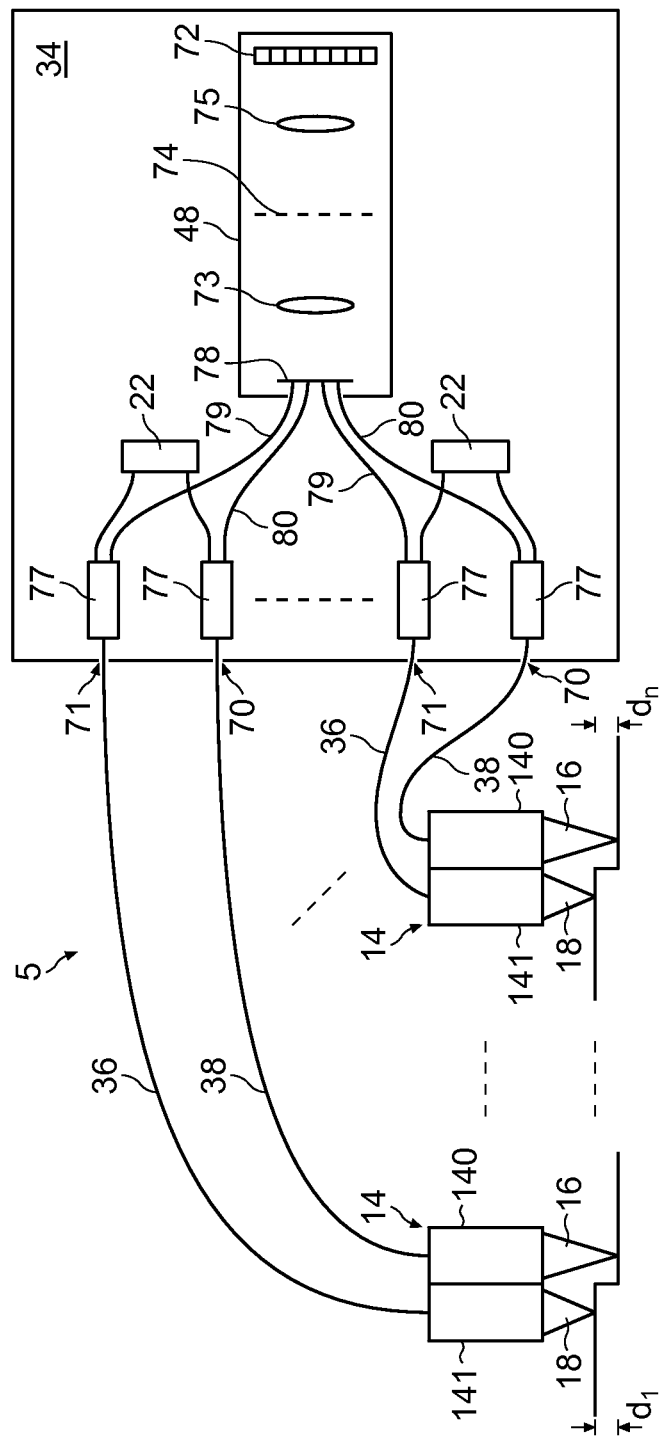
FIG. 5 shows a schematic diagram of an optical measuring instrument for acquiring a difference in distance according to an embodiment of the invention wherein the optical measuring instrument has 2n measuring heads and a multichannel measuring apparatus with one single spectrometer with preferably one single spectrometer line.

A particular advantage of the embodiment shown here can be seen in the fact that only one single spectrometer line 72 is required to evaluate the reflection spectra of both measuring heads 140, 141, whereby the characteristic curves can be different. As a result it is also possible to evaluate the peak position, which corresponds to detector pixels, without ambiguity. FIG. 5 shows a fourth embodiment of the optical measuring device 5. As shown in FIG. 5, the optical measuring device 5 may have a multiplicity of optical measuring heads 14, each measuring head 14 having a dual beam guide as already explained above.

Furthermore, each measuring head can operate autonomously so that each dual measuring head 14 can acquire a difference in distance $d_1$ to $d_n$ in the manner explained above. All dual measuring heads 14 can be connected to two channels of the multi-channel measuring apparatus 34 such that the optical measuring device 5 has 2n single measuring heads 140, 141 and one multi-channel measuring apparatus 34 with 2n channels. Here again the multi-channel measuring apparatus is fitted with a single spectrometer 48 with a single spectrometer line 72, it being possible to evaluate all measurement signals and all reflection spectra of the measuring heads 140, 141 using the spectrometer line 72. The embodiments shown in FIGS. 4 and 5 can be combined with the embodiments in FIGS. 1 to 3.

For example, according to the embodiment shown in FIG. 5 the spectrometer 34 can also have one or more multiplexers. Where this is the case, the multiplexers should preferably be positioned so that a different pair of measuring heads 140, 141 is selected for each pulse. Details of the frequency and operation of the multiplexer have already been detailed in relation to the examples given above and can also be applied here with appropriate adaptations. Furthermore, means may be provided to allow further differentiation between the characteristic curves. In the case of chromatic confocal measurement, this is achieved partially by the specific positioning of the 2n light guides 79, 80 which can be positioned in spectral direction in different positions along the direction of the spectrometer line 72 of the spectrometer 48.

LIST OF REFERENCE NUMERALS

2 Optical measuring device (1$^{st}$ embodiment)
3 Optical measuring device (3$^{rd}$ embodiment)
4 Optical measuring device (2$^{nd}$ embodiment)
5 Optical measuring device (4$^{th}$ embodiment)
6 Stage height
8 Support
10 Edge region
12 Object
14, 14' Measuring head
15 Dual beam guide
16 First measuring beam
18 Second measuring beam
20 Measuring head guide device
22 Light source
23 First light beam
24 Second light beam
26, 26' Measuring head optics
28 First measuring point (on support)
30 Second measuring point (object)
32 Evaluation unit
34 Multi-channel measuring apparatus
36 Optical fibre
38 Optical fibre
39 Spectrometer
40 Multiplexer
42 Light guide
44 Electronic filter
46 Light guide
48 Spectrometer
50 Thin grinding machine
52 Grinding disc
54 Surface of grinding disc
56 Layer
58 Axis of grinding disc
60 Holder for object to be measured
62 Sensor line
64 Connecting line
66 Display unit
70 Multi-channel measuring apparatus input
71 Multi-channel measuring apparatus input
72 Spectrometer line
75 Focussing lens
76 Light source
77 Y-coupler
78 Holder for fibre optic connectors
79 Light guide
80 Light guide
81 Offset in spectral direction
140 Single measuring head
141 Single measuring head
A Direction of rotation
B Direction of rotation
C Direction of rotation
c Distance
D Diameter of object to be measured
d Thickness
e Distance
R Radius of grinding disc

The invention claimed is:

1. An optical measuring device for acquiring differences in distance, in particular for acquiring in situ a stage height between a support and an edge region of an object, the device comprising:

an optical measuring head with a dual beam guide, the optical measuring head configured as a dual measuring head having a first measuring head and a second measuring head;

a measuring head guide device in which the first measuring head and the second measuring head are positioned side by side and connected mechanically, the first measuring head configured to acquire and form a reflection spectrum of a first measuring beam directed towards a first measuring point located on the support and the second measuring head configured to acquire and form a reflection spectrum of a second measuring beam directed towards a second measuring point located on the edge region of the object;

at least two spectral broadband light sources for producing light of the first measuring beam and the second measuring beam;

a first optical fibre for coupling reflected light from the first measuring beam and a second optical fibre for coupling reflected light from the second measuring beam into different measurement inputs of a multi-channel measuring apparatus with at least two measurement inputs;

a first light guide, a second light guide, a third light guide, and a fourth light guide; and a common spectrometer line positioned in the multi-channel measuring apparatus on which both the reflected light from the first measuring beam and the reflected light from the second measuring beam are directed and with which the reflection spectrum of the first measuring beam and the reflection spectrum of the second measuring beam are measured, the multi-channel measuring apparatus comprising at least one Y-coupler for each of the at least two measurement inputs of the multi-channel measuring apparatus, the first light guide coupled to a first spectral broadband light source of the at least two spectral broadband light sources and the second light guide coupled to a second spectral broadband light source of the at least two spectral broadband light sources, the first light guide and the third light guide connected to an input of a first Y-coupler of the at least one Y-coupler, each of the second light guide and the fourth light guide connected to an input of a second Y-coupler of the at least one Y-coupler, each of the third light guide and the fourth light guide routed to and secured by a holder on an input side of a spectrometer of the multi-channel measuring apparatus, the third light guide and the fourth light guide being offset in relation to one another in a spectral direction via the holder along a lengthwise direction of the spectrometer line on the input side of the spectrometer, characteristic curves of the reflection spectra differing from one another and the reflection spectra of the measuring heads differing from one another, distance peaks that are formed from the reflection spectra of the first measuring beam and the second measuring beam being evaluated as a measure of a difference in distance.

2. The optical measuring device according to claim 1, wherein the optical measuring device has a multiplicity of optical measuring heads with dual beam guides, each optical measuring head being configured as a dual measuring head with a first measuring head and a second measuring head.

3. The optical measuring device according to claim 2, wherein each of the first measuring heads and each of the second measuring heads is connected by an optical fibre to a different measurement input of the multi-channel measuring apparatus so that the reflection spectrum of each of the first measuring heads and each of the second measuring heads are evaluated by the spectrometer line positioned in the multi-channel measuring apparatus.

4. The optical measuring device according to claim 2, wherein the multi-channel measuring apparatus has at least one multiplexer which switches between pairs of one first measuring head and one second measuring head.

5. The optical measuring device according to claim 4, wherein the multi-channel measuring apparatus has a multiline detector.

6. The optical measuring device according to claim 1, further comprising an electronic filter.

7. An optical measuring method for acquiring at least one difference in distance, in particular for acquiring in situ a stage height between a support and an edge region of an object, whereby the method comprises the following steps:
providing a measuring device with an optical measuring head with a dual beam guide, which is configured as a dual measuring head with a first measuring head and a second measuring head, in a measuring head guide device in which the first measuring head and the second measuring head are positioned side by side and connected mechanically, the measuring device further comprising a first light guide, a second light guide, a third light guide, a fourth light guide, at least two spectral broadband light sources, and a multi-channel measuring apparatus comprising a plurality of measurement inputs and at least one Y-coupler for each of at least two measurement inputs of the multi-channel measuring apparatus;
coupling light from a first spectral broadband light source of the at least two spectral broadband light sources to an input of a first Y-coupler of the at least one Y-coupler via the first light guide and from a second spectral broadband light source of the at least two spectral broadband light sources to an input of a second Y-coupler of the at least one Y-coupler via the second light guide;
producing a first measuring beam by the first measuring head and a second measuring beam by the second measuring head by means of the at least two spectral broadband light sources, wherein the first measuring head directs a first measuring beam towards a first measuring point and the second measuring head directs a second measuring beam towards a second measuring point, reflection spectra being formed in each case;
coupling reflected light from the first measuring beam via the third light guide and reflected light from the second measuring beam via the fourth light guide into different measurement inputs of the multi-channel measuring apparatus, wherein the third light guide is coupled to the input of the first Y-coupler and the fourth light guide is coupled to the input of the second Y-coupler;
offsetting the fourth light guide from the third light guide in a spectral direction along a lengthwise direction of a spectrometer line with a holder on an input side of a spectrometer of the multi-channel measuring apparatus, each of the third light guide and the fourth light guide secured to the holder, the spectrometer line positioned in the multi-channel measuring apparatus, the spectrometer line being a common spectrometer line on which both the reflected light from the first measuring beam and the reflected light from the second measuring beam are directed, characteristic curves of the reflection spectra differing from one another and the reflection spectra of the measuring heads differing from one another; and
measuring the reflection spectra by means of the spectrometer line and an evaluation unit connected downstream of the spectrometer line, distance peaks being formed according to distances between the first measuring point and the first measuring head and between the second measuring point and the second measuring head, the distance peaks being evaluated as a measure of a difference in distance.

8. The method according to claim 7, wherein during the measuring step the measuring head is held in a fixed position in the measuring head guide device and the support and the object move rotationally in opposite directions of rotation under the measuring head.

9. The method according to claim 7, wherein during the measuring step a first measuring point is configured on the support and a second measuring point is configured on the edge region of the object, and their respective distances from the measuring head are acquired.

10. The method according to claim 7, wherein a decreasing object thickness is documented in situ by calculating the difference between the acquired distance values.

11. The method according to claim 7, wherein a chromatic confocal measuring method is used to acquire the difference in distance.

12. The method according to claim 7, wherein an interferometric measuring method is used to acquire the difference in distance.

13. The method according to claim 7, wherein the reflection spectra of the first measuring beam which is directed towards the support and the second measuring beam which is directed towards the edge region of the object are digitized for evaluation.

14. The method according to claim 7, wherein the surface of the edge region of the object and the surface of the support are scanned at a scanning rate of more than 4 kHz.

15. The method according to claim 7, wherein measuring errors are filtered out by an electronic digital filter in the evaluation unit.

* * * * *